(12) United States Patent
Faitelson et al.

(10) Patent No.: US 10,229,191 B2
(45) Date of Patent: *Mar. 12, 2019

(54) ENTERPRISE LEVEL DATA MANAGEMENT

(75) Inventors: Yakov Faitelson, Elkana (IL); Ohad Korkus, Herzeliya (IL); David Bass, Carmei Yoseph (IL); Ophir Kretzer-Katzir, Reut (IL)

(73) Assignee: VARONIS SYSTEMS LTD., Herzliya (IL)

(*) Notice: Subject to any disclaimer, the term of this patent is extended or adjusted under 35 U.S.C. 154(b) by 0 days.

This patent is subject to a terminal disclaimer.

(21) Appl. No.: 13/413,748

(22) Filed: Mar. 7, 2012

(65) Prior Publication Data

US 2012/0215780 A1    Aug. 23, 2012

Related U.S. Application Data

(63) Continuation-in-part of application No. 12/673,691, filed as application No. PCT/IL2010/000069 on Jan. 27, 2010, now Pat. No. 9,904,685.

(60) Provisional application No. 61/240,726, filed on Sep. 9, 2009.

(51) Int. Cl.
    *G06F 17/30* (2006.01)

(52) U.S. Cl.
    CPC .. *G06F 17/30693* (2013.01); *G06F 17/30011* (2013.01); *G06F 17/30876* (2013.01); *G06F 17/30976* (2013.01)

(58) Field of Classification Search
    CPC ......... G06F 17/30693; G06F 17/30011; G06F 17/30876; G06F 17/30976
    See application file for complete search history.

(56) References Cited

U.S. PATENT DOCUMENTS

| | | |
|---|---|---|
| 5,465,387 A | 11/1995 | Mukherjee |
| 5,889,952 A | 3/1999 | Hunnicutt et al. |
| 5,899,991 A | 5/1999 | Karch |
| 5,941,947 A | 8/1999 | Brown et al. |

(Continued)

FOREIGN PATENT DOCUMENTS

| | | |
|---|---|---|
| CN | 1588889 A | 3/2005 |
| CN | 1916903 A | 2/2007 |

(Continued)

OTHER PUBLICATIONS

FINDUTILS-GNU-Project-Free Software Foundation(FSF), 3 pages, Nov. 2006.

(Continued)

*Primary Examiner* — Huawen A Peng
(74) *Attorney, Agent, or Firm* — Ladas & Parry LLP

(57) ABSTRACT

A system for identifying data of interest from among a multiplicity of data elements residing on multiple platforms in an enterprise, the system including background data characterization functionality characterizing the data of interest at least by at least one content characteristic thereof and at least one access metric thereof, the at least one access metric being selected from data access permissions and actual data access history and near real time data matching functionality selecting the data of interest by considering only data elements which have the at least one content characteristic thereof and the at least one access metric thereof from among the multiplicity of data elements.

8 Claims, 7 Drawing Sheets

(56) References Cited

U.S. PATENT DOCUMENTS

| | | | |
|---|---|---|---|
| 6,023,765 A | 2/2000 | Kuhn | |
| 6,308,173 B1 | 10/2001 | Glasser et al. | |
| 6,338,082 B1 | 1/2002 | Schneider | |
| 6,393,468 B1 | 5/2002 | McGee | |
| 6,675,161 B1 | 1/2004 | Suchter | |
| 6,772,350 B1 | 8/2004 | Belani et al. | |
| 6,928,439 B2 | 8/2005 | Satoh | |
| 7,031,984 B2 | 4/2006 | Kawamura et al. | |
| 7,068,592 B1 | 6/2006 | Duvaut et al. | |
| 7,124,272 B1 | 10/2006 | Kennedy et al. | |
| 7,401,087 B2* | 7/2008 | Copperman et al. | 707/737 |
| 7,403,925 B2 | 7/2008 | Schlesinger et al. | |
| 7,421,740 B2 | 9/2008 | Fey et al. | |
| 7,478,035 B1* | 1/2009 | Wrench | G06F 17/30867 704/10 |
| 7,529,748 B2 | 5/2009 | Wen et al. | |
| 7,555,482 B2 | 6/2009 | Korkus | |
| 7,606,801 B2 | 10/2009 | Faitelson et al. | |
| 7,716,240 B2 | 5/2010 | Lim | |
| 8,296,255 B1 | 10/2012 | Wawda | |
| 2003/0023476 A1 | 1/2003 | Gainey | |
| 2003/0051026 A1 | 3/2003 | Carter et al. | |
| 2003/0231207 A1 | 12/2003 | Huang | |
| 2004/0030915 A1 | 2/2004 | Sameshima et al. | |
| 2004/0186809 A1 | 9/2004 | Schlesinger et al. | |
| 2004/0205342 A1 | 10/2004 | Roegner | |
| 2004/0249847 A1 | 12/2004 | Wang et al. | |
| 2004/0254919 A1 | 12/2004 | Giuseppini | |
| 2004/0267729 A1 | 12/2004 | Swaminathan | |
| 2005/0065823 A1 | 3/2005 | Ramraj et al. | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0240457 A1 | 10/2005 | Connally et al. | |
| 2005/0246762 A1 | 11/2005 | Girouard et al. | |
| 2005/0278334 A1 | 12/2005 | Fey et al. | |
| 2006/0064313 A1 | 3/2006 | Steinbarth et al. | |
| 2006/0184459 A1 | 8/2006 | Parida | |
| 2006/0184530 A1 | 8/2006 | Song et al. | |
| 2006/0277184 A1 | 12/2006 | Faitelson et al. | |
| 2007/0011091 A1 | 1/2007 | Smith | |
| 2007/0033340 A1 | 2/2007 | Tulskie et al. | |
| 2007/0061487 A1 | 3/2007 | Moore et al. | |
| 2007/0073698 A1 | 3/2007 | Kanayama et al. | |
| 2007/0112743 A1 | 5/2007 | Giampaolo et al. | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0244899 A1 | 10/2007 | Faitelson et al. | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0097998 A1 | 4/2008 | Herbach | |
| 2008/0126172 A1 | 5/2008 | Melamed et al. | |
| 2008/0162707 A1 | 7/2008 | Beck et al. | |
| 2008/0172720 A1 | 7/2008 | Botz et al. | |
| 2008/0183680 A1* | 7/2008 | Meynier | G06F 17/301 |
| 2008/0209535 A1 | 8/2008 | Athey | |
| 2008/0256619 A1 | 10/2008 | Neystadt | |
| 2008/0270462 A1 | 10/2008 | Thomsen | |
| 2008/0271157 A1 | 10/2008 | Faitelson | |
| 2009/0031418 A1 | 1/2009 | Matsuda et al. | |
| 2009/0043775 A1 | 2/2009 | Cotner et al. | |
| 2009/0100058 A1* | 4/2009 | Faitelson et al. | 707/9 |
| 2009/0119298 A1* | 5/2009 | Faitelson et al. | 707/9 |
| 2009/0150981 A1 | 6/2009 | Amies et al. | |
| 2009/0157570 A1* | 6/2009 | Pall et al. | 706/11 |
| 2009/0182715 A1 | 7/2009 | Falkenberg | |
| 2009/0198892 A1 | 8/2009 | Alvarez et al. | |
| 2009/0249446 A1 | 10/2009 | Jenkins et al. | |
| 2009/0265780 A1 | 10/2009 | Korkus et al. | |
| 2009/0320088 A1 | 12/2009 | Gill et al. | |
| 2010/0023523 A1 | 1/2010 | Chung et al. | |
| 2010/0037324 A1 | 2/2010 | Grant et al. | |
| 2010/0100524 A1* | 4/2010 | Bae et al. | 707/609 |
| 2010/0174731 A1* | 7/2010 | Vermeulen et al. | 707/758 |
| 2010/0185650 A1* | 7/2010 | Topatan et al. | 707/769 |
| 2010/0257456 A1* | 10/2010 | Lieb et al. | 715/741 |
| 2010/0299763 A1* | 11/2010 | Marcus et al. | 726/30 |
| 2011/0010758 A1 | 1/2011 | Faitelson et al. | |
| 2011/0047466 A1* | 2/2011 | Michelman | 715/734 |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2012/0221550 A1 | 8/2012 | Korkus et al. | |

FOREIGN PATENT DOCUMENTS

| | | |
|---|---|---|
| CN | 101283357 A | 10/2008 |
| CN | 101692228 | 4/2010 |
| CN | 1906613 | 10/2010 |
| EP | 1 248 178 B1 | 10/2002 |
| WO | 2011/030324 A1 | 3/2011 |
| WO | 2011/092684 A1 | 8/2011 |
| WO | 2011/092685 A1 | 8/2011 |
| WO | 2011/092686 A1 | 8/2011 |
| WO | 2011/148376 A2 | 12/2011 |
| WO | 2011/148377 A1 | 12/2011 |

OTHER PUBLICATIONS

Writing Filesystems—VFS and Vnode Interfaces—Genunix, 5 pages, Oct. 2007.

S.R. Kleiman; "Vnodes: An Architecture for Multiple File System Types n Sun UNIX", USENIX Association: Summer Conference Proceedings, Atlanta 1986, 10 pages.

Sara C. Madeira, et al; "Biclustering Algorithms for Biological Data Analysis: A Survey", 22 pages, Mar. 2004; http://www.cs.princeton.edu/courses/archive/spr05/cos598E/bib/bicluster.pdf.

Sara C. Maeria; Clustering, Fuzzy Clustering and Biclustering: An Overview; pp. 31 to 53, Jun. 27, 2003.

Sahadeb De, et al; "Secure Access Control in a Multi-user Geodatabase", available on the Internet at the URL http://www10.giscafe.com. 10 pages, 2005.

Edgar Weippl, et al; "Content-based Management of Document Access Control", 14th International Conference on Applications of Prolog (INAP), 2001, 9 pages.

German Office Action dated Sep. 14, 2012 issued during prosecution of German Patent Application No. 11 2006 001378.5.

USPTO NFOA dated Feb. 12, 2008 in connection with U.S. Appl. No. 11/258,256.

USPTO FOA dated Aug. 1, 2008 in connection with U.S. Appl. No. 11/258,256.

USPTO NFOA dated Oct. 31, 2008 in connection with U.S. Appl. No. 11/635,736.

USPTO NFOA dated Dec. 14, 2010 in connection with U.S. Appl. No. 11/786,522.

USPTO NFOA dated Mar. 13, 2012 in connection with U.S. Appl. No. 11/786,522.

USPTO NFOA dated Jul. 9, 2010 in connection with U.S. Appl. No. 11/789,884.

USPTO FOA dated Dec. 14, 2010 in connection with U.S. Appl. No. 11/789,884.

USPTO NFOA dated Aug. 28, 2012 in connection with U.S. Appl. No. 12/673,691.

USPTO NFOA dated Jul. 5, 2012 in connection with U.S. Appl. No. 12/772,450.

USPTO NFOA dated Jun. 22, 2012 in connection with U.S. Appl. No. 12/814,807.

USPTO NFOA dated Sep. 14, 2012 in connection with U.S. Appl. No. 12/861,967.

International Preliminary Report on Patentability; dated Mar. 13, 2012 issued during prosecution of PCT/IL2010/000069.

International Preliminary Report on Patentability dated Jul. 31, 2012 issued during prosecution of PCT/IL2011/000066.

International Preliminary Report on Patentability dated Jul. 31, 2012 issued during prosecution of PCT/IL2011/000065.

(56) References Cited

OTHER PUBLICATIONS

International Preliminary Report on Patentability dated Jul. 31, 2012 issued during prosecution of PCT/IL2011/000078.
International Search Report and Written Opinion dated May 23, 2011 issued during the prosecution of PCT/IL2011/000065.
International Search Report and Written Opinion dated Jun. 14, 2011 issued during the prosecution of PCT/IL11/00066.
International Search Report and Written Opinion dated May 20, 2010 issued during the prosecution of PCT/IL/00069.
International Search Report and Written opinion dated May 25, 2001 issued during prosecution of PCT/IL11/00078.
International Search Report and Written Opinion dated Nov. 15, 2011 issued during the prosecution of PCT/IL11/00408.
International Search Report and Written Opinion dated Oct. 1, 2012 issued during the prosecution of PCT/IL2012/000240.
An Office Action dated Mar. 4, 2013, which issued during the prosecution of U.S. Appl. No. 12/814,807.
Office Action dated Dec. 18, 2013, which issued during the prosecution of U.S. Appl. No. 12/673,691.
Notice of Allowance dated Jul. 12 2013, which issued during the prosecution of U.S. Appl. No. 12/814,807.
An Office Action dated Feb. 14, 2013, which issued during the prosecution of U.S. Appl. No. 13/014,762.
An Office Action dated Mar. 25, 2013, which issued during the prosecution of U.S. Appl. No. 13/303,826.
An English translation of an Office Action dated Jun. 3, 2014 which issued during the prosecution of Chinese Patent Application No. 201080046731.
An Office Action dated Aug. 14, 2014, which issued during the prosecution of U.S. Appl. No. 12/673,691.
USPTO FOA dated Feb. 9, 2016 in connection with U.S. Appl. No. 12/673,691.
An Office Action dated Mar. 1, 2017 which issued during the prosecution of Chinese Patent Application No. 2012800711553.
An Office Action dated Sep. 1, 2016 which issued during the prosecution of U.S. Appl. No. 12/673,691.
English Transiation First Chinese Office Action dated Jul. 4, 2016; Appln. No. 2012800711553.
An Office Action dated Apr. 27, 2017, which issued during the prosecution of U.S. Appl. No. 12/673,691.

\* cited by examiner

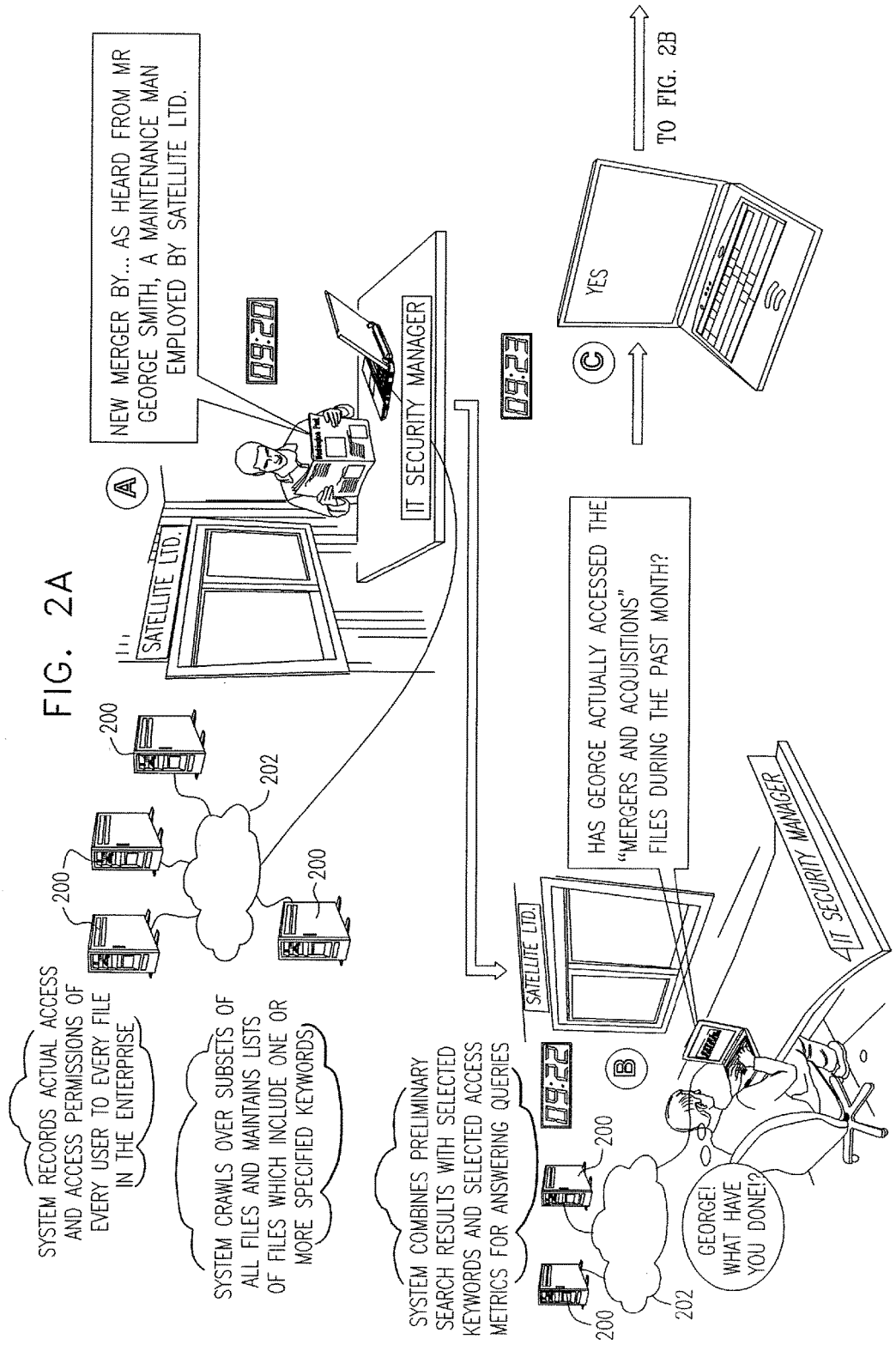

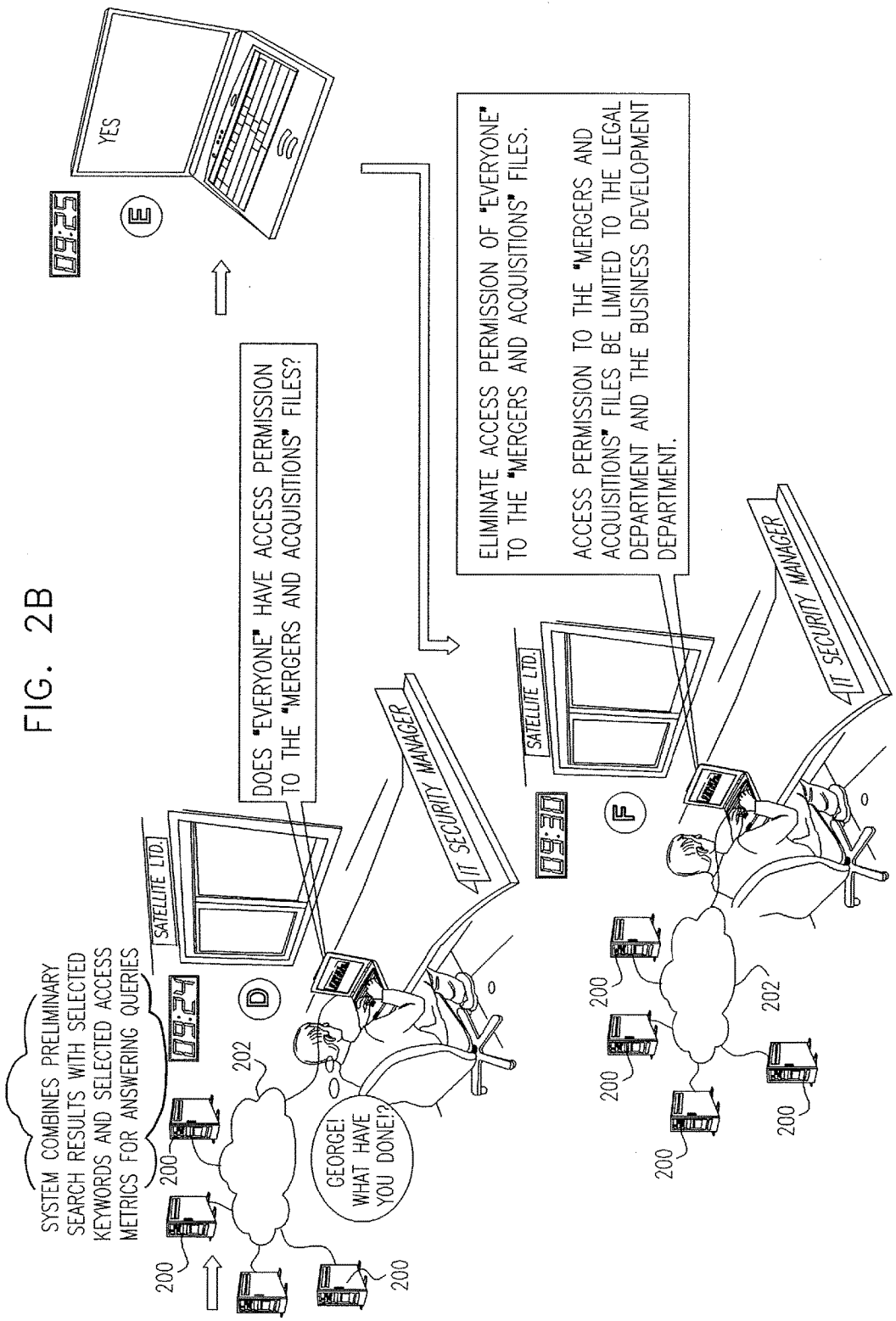

ENTERPRISE LEVEL DATA MANAGEMENT

REFERENCE TO RELATED APPLICATIONS

The present application is a Continuation in Part of U.S. patent application Ser. No. 12/673,691, filed Feb. 16, 2010 and entitled "ENTERPRISE LEVEL DATA MANAGEMENT", which is a national phase application of PCT/IL2010/000069 filed Jan. 27, 2010 and entitled "ENTERPRISE LEVEL DATA MANAGEMENT", which claims priority of U.S. Provisional Patent Application Ser. No. 61/240,726, filed Sep. 9, 2009 and entitled USE OF ACCESS METRIC IN LARGE SCALE DATA MANIPULATION, the disclosure of which is hereby incorporated by reference and priority of which is hereby claimed pursuant to 37 CFR 1.78(a) (4) and (5)(i), all of which are incorporated by reference.

Reference is also made to the following patents and patent applications, owned by assignee, the disclosures of which are hereby incorporated by reference, which are believed to relate to subject matter similar to the subject matter of the present application:

U.S. Pat. Nos. 7,555,482 and 7,606,801;

U.S. Published Patent Application Nos. 2007/0244899, 2008/0271157, 2009/0100058, 2009/0265780 and 2009/0119298; and U.S. patent application Ser. No. 12/498,675.

FIELD OF THE INVENTION

The present invention relates to data management generally and more particularly enterprise level data management.

BACKGROUND OF THE INVENTION

The following patent publications and articles are believed to represent the current state of the art:

U.S. Pat. Nos. 7,031,984; 6,338,082; 6,928,439; 7,555,482; 7,606,801; 6,393,468; 5,899,991; 7,068,592 and 5,465,387.

U.S. Published Patent Application Nos.: 2003/0051026; 2004/0249847; 2004/0186809; 2005/0108206; 2005/0278334; 2005/0203881; 2005/0120054; 2005/0086529; 2006/0064313; 2006/0184530; 2006/0277184; 2006/0184459 and 2007/0203872.

SUMMARY OF THE INVENTION

The present invention provides improved systems and methodologies for data management.

There is thus provided in accordance with a preferred embodiment of the present invention a system for identifying data of interest from among a multiplicity of data elements residing on multiple platforms in an enterprise, the system including background data characterization functionality characterizing the data of interest at least by at least one content characteristic thereof and at least one access metric thereof, the at least one access metric being selected from data access permissions and actual data access history and near real time data matching functionality selecting the data of interest by considering only data elements which have the at least one content characteristic thereof and the at least one access metric thereof from among the multiplicity of data elements.

Preferably, the near real time data matching functionality includes background field of search definition and searching functionality operative to define a field of search in accordance with the at least one access metric and to search within the field of search based on the at least one content characteristic.

In accordance with a preferred embodiment of the present invention the near real time data matching functionality includes background field of search definition and searching functionality operative to define a field of search in accordance with the at least one access metric multiple times and to search within the field of search multiple times, wherein the at least one access metric is different at least some of the multiple times.

Preferably, the at least one access metric is a dynamic metric which changes over time during operation of the enterprise.

In accordance with a preferred embodiment of the present invention the system also includes automatic field of search redefinition and search functionality operative to redefine the field of search in accordance with the at least one access metric multiple times and search within the field of search multiple times, wherein the at least one access metric is different at least some of the multiple times. Additionally, the automatic field of search redefinition and search functionality is operative to search only within those portions of the field of search that have been modified or added as the result of redefining the field of search in accordance with changes in the at least one access metric. Alternatively or additionally, the system also includes data element status monitoring functionality, noting the current status of data elements that have been modified, added or removed in accordance with changes in the at least one access metric.

Preferably, the searching is prioritized at least in accordance with at least one access metric related prioritization characteristic. Additionally, results of the searching are ordered at least in accordance with at least one access metric related prioritization characteristic.

In accordance with a preferred embodiment of the present invention the near real time data matching functionality includes searching functionality for searching for data elements which have the at least one content characteristic thereof and identification functionality operative separately from the searching for data elements which have the at least one content characteristic thereof, identifying data elements from among the multiplicity of data elements in accordance with the at least one access metric and combining functionality, combining results of the searching and the identifying. Additionally, the searching and the identifying are performed by separate entities.

There is also provided in accordance with another preferred embodiment of the present invention a method for identifying data of interest from among a multiplicity of data elements residing on multiple platforms in an enterprise, the method including characterizing the data of interest at least by at least one content characteristic thereof and at least one access metric thereof, the at least one access metric being selected from data access permissions and actual data access history and selecting the data of interest by considering only data elements which have the at least one content characteristic thereof and the at least one access metric thereof from among the multiplicity of data elements.

Preferably, the considering includes defining a field of search in accordance with the at least one access metric and searching within the field of search based on the at least one content characteristic.

In accordance with a preferred embodiment of the present invention the considering includes defining a field of search in accordance with the at least one access metric multiple times and searching within the field of search multiple times, wherein the at least one access metric is different at least some of the multiple times.

Preferably, the at least one access metric is a dynamic metric which changes over time during operation of the enterprise.

In accordance with a preferred embodiment of the present invention the method also includes automatically redefining the field of search in accordance with the at least one access metric multiple times and searching within the field of search multiple times, wherein the at least one access metric is different at least some of the multiple times. Additionally, the searching includes searching only within those portions of the field of search that have been modified or added as the result of redefining the field of search in accordance with changes in the at least one access metric. Alternatively or additionally, the method also includes noting the current status of data elements that have been modified, added or removed in accordance with changes in the at least one access metric.

In accordance with a preferred embodiment of the present invention the searching is prioritized at least in accordance with at least one access metric related prioritization characteristic. Additionally, results of the searching are ordered at least in accordance with at least one access metric related prioritization characteristic.

Preferably, the selecting the data of interest by considering only data elements which have the at least one content characteristic thereof and the at least one access metric thereof from among the multiplicity of data elements includes searching for data elements which have the at least one content characteristic thereof, separately from the searching for data elements which have the at least one content characteristic thereof, identifying data elements from among the multiplicity of data elements in accordance with the at least one access metric and combining results of the searching and the identifying. Additionally, the searching and the identifying are performed by separate entities.

There is further provided in accordance with yet another preferred embodiment of the present invention a system for indexing data of interest within a multiplicity of data elements residing on multiple platforms in an enterprise, the system including background data characterization functionality operable for characterizing the multiplicity of data elements at least by at least one access metric thereof, the at least one access metric being selected from data access permissions and actual data access history to provide a background data characterization output, background data classification functionality operative to classify the data of interest based at least partially on the background data characterization output and providing a background data of interest classification output, and indexing functionality operative to index the data of interest based at least partially on the background data of interest classification output.

Preferably, the system also includes near real time data matching functionality operable for selecting data of interest by considering only data elements which have the at least one access metric thereof from among the classification output. Preferably, the indexing functionality is operative to index the data of interest also based on the background data characterization output. Preferably, the at least one access metric is a dynamic metric which changes over time during operation of the enterprise.

In accordance with a preferred embodiment of the present invention the near real time data matching functionality includes searching functionality operable to employ an output of the indexing functionality for searching for data elements which have the at least one content characteristic thereof, identification functionality operable for identifying data elements from among the multiplicity of data elements in accordance with the at least one access metric, and combining functionality operable for combining results of the searching and the identifying. Preferably, the searching functionality and the identifying functionality are provided by separate entities.

There is further provided in accordance with yet another preferred embodiment of the present invention a method for indexing data of interest within a multiplicity of data elements residing on multiple platforms in an enterprise, the method including characterizing the multiplicity of data elements at least by at least one access metric thereof, the at least one access metric being selected from data access permissions and actual data access history to provide a background data characterization output, classifying the data of interest based at least partially on the background data characterization output and providing a background data of interest classification output, and indexing the data of interest based at least partially on the background data of interest classification output.

Preferably, the method also includes selecting, in near real time, data of interest by considering only data elements which have the at least one access metric thereof from among the classification output. Preferably, the indexing also includes indexing the data of interest based on the background data characterization output. Preferably, the at least one access metric is a dynamic metric which changes over time during operation of the enterprise.

In accordance with a preferred embodiment of the present invention the selecting includes employing an output of the indexing for searching for data elements which have the at least one content characteristic thereof, identifying data elements from among the multiplicity of data elements in accordance with the at least one access metric, and combining results of the searching and the identifying.

Preferably, the searching and the identifying are performed by separate entities.

BRIEF DESCRIPTION OF THE DRAWINGS

The present invention will be understood and appreciated more fully from the following detailed description, taken in conjunction with the drawings in which:

FIGS. 2A and 2B are simplified pictorial illustrations of another example of operation of the system and methodology of the present invention;

DETAILED DESCRIPTION OF A PREFERRED EMBODIMENT

Figure 1:
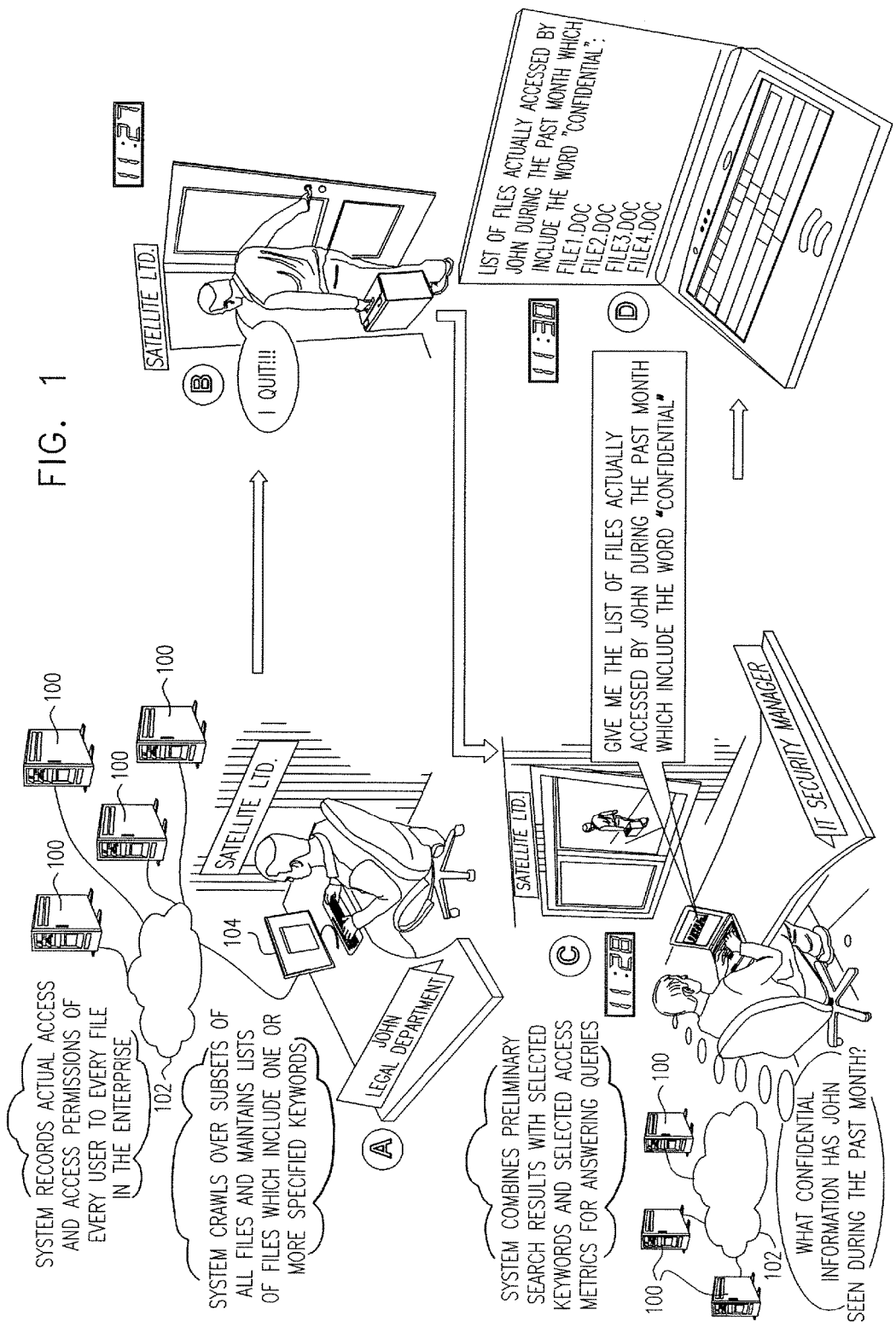
FIG. 1 is a simplified pictorial illustration of one example of operation of the system and methodology of the present invention.

Reference is now made to FIG. 1, which is a simplified pictorial illustration of one example of operation of the system and methodology of the present invention. As seen in FIG. 1, there is provided a system and method for identifying data of interest from among a multiplicity of data elements residing on multiple platforms in an enterprise.

Two essential functions are performed:

characterizing the data of interest at least by at least one content characteristic thereof and at least one access metric thereof, the at least one access metric being selected from data access permissions and actual data access history; and selecting the data of interest by considering only data elements which have the at least one content characteristic thereof and the at least one access metric thereof from among the multiplicity of data elements.

In the example of FIG. 1, an enterprise typically has multiple servers 100 which may be located in disparate locations and are connected by a network 102. The network is typically connected to many clients, of which client 104, a computer which is used by a user named John, is an example. The servers 100 typically contain many files, which are typically numbered in the thousands, hundreds of thousands or millions. John typically has access permissions to some but not all of the files of the enterprise and in any given period, such as a week, month or year, actually accesses some but not all of the files of the enterprise for which he has access permission.

As illustrated pictorially at stage A in FIG. 1, the system and methodology of the present invention operates in the background to record actual access and access permissions of every user to every file in the enterprise. It is appreciated that the scope of activities of the system and methodology of the present invention may be restricted to exclude certain users and certain files.

The system and methodology of the present invention also operates in the background to crawl over subsets of all files in the enterprise and to maintain lists of files which include one or more specified item such as a text or non-text item, a string and one or more specified keywords.

Preferably, subsets of all files are selected in accordance with access permission metrics. For example, for personnel having access permission to legal department files, the subset for crawling is the legal department files.

The specified text item or items may be selected by a manager as being appropriate for each subset. Thus, for example for the subject of legal department files, keywords such as "confidential" "lawsuit" and "judgment" may be appropriate. In other contexts, strings of various types, such as sequences of numbers or non-textual characters, may be employed. The set of items may be updated from time to time by an authorized manager.

Returning to the example of FIG. 1, it is seen that at stage B, John abruptly terminates his employment at the enterprise. In accordance with company policy, as seen at stage C, the IT Security Manager immediately queries the system to indicate what files marked "Confidential" John had actually accessed during the month previous to termination of his employment. The IT Security Manager receives a response to his query in near real time, typically within a minute.

It is a particular feature of the present invention that due to the background operation of the system and methodology of the present invention whereby the history of actual access of every user to every file in the enterprise is recorded and lists of files which include specified items are maintained, the query of the IT Security Manager can be responded to in near real time. The system and methodology of the present invention achieves this near real time response by combining currently available actual access and access permissions information with preliminary search result information.

Reference is now made to FIGS. 2A and 2B, which are simplified pictorial illustrations of another example of operation of the system and methodology of the present invention. As seen in FIGS. 2A and 2B, there is provided a system and method for identifying data of interest from among a multiplicity of data elements residing on multiple platforms in an enterprise. The same two essential functions described hereinabove with reference to FIG. 1 are performed by the system and functionality of the present invention.

As in the example of FIG. 1, an enterprise typically has multiple servers 200 which may be located in disparate locations and are connected by a network 202. The network is typically connected to many clients. The servers 200 typically contain many files, which are typically numbered in the thousands, hundreds of thousands or millions.

As illustrated pictorially at stage A in FIG. 2A, similarly to FIG. 1, the system and methodology of the present invention operates in the background to record actual access and access permissions of every user to every file in the enterprise. It is appreciated that the scope of activities of the system and methodology of the present invention may be restricted to exclude certain users and certain files.

The system and methodology of the present invention also operates in the background to crawl over subsets of all files in the enterprise and to maintain lists of files which include one or more specified items.

Preferably, subsets of all files are selected in accordance with access permission metrics. For example, for personnel having access permission to legal department files, the subset for crawling is the legal department files.

The specified items may be selected by a manager as being appropriate for each subset. Thus, for example for the subject of legal department files, keywords such as "merger" "acquisition" and "buyout" may be appropriate. The set of keywords may be updated from time to time by an authorized manager.

Returning to the example of FIGS. 2A and 2B, it is seen that at stage A in FIG. 2A, an IT Security Manager becomes aware of a leak of company information to the press. The IT Security Manager queries the system as follows:

1. Did the person to whom the leak is attributed actually access the computer files relating to mergers and acquisitions?

2. Are the computer files relating to mergers and acquisitions available to "everyone" in the enterprise?

The IT Security Manager receives a response to his query in near real time, typically within a minute.

It is a particular feature of the present invention that due to the background operation of the system and methodology of the present invention whereby the history of actual access and access permissions of every user to every file in the enterprise is recorded and lists of files which include specified items are maintained, the query of the IT Security Manager can be responded to in near real time. The system and methodology of the present invention achieves this near real time response by combining currently available actual access and access permissions information with preliminary search result information.

On the basis of the response to his queries, the IT Security Manager immediately orders elimination of the access permission of "everyone" to the merger and acquisition files and orders that the access permission to the mergers and acquisitions files be henceforth limited to the legal department and the business development department.

Figure 3:
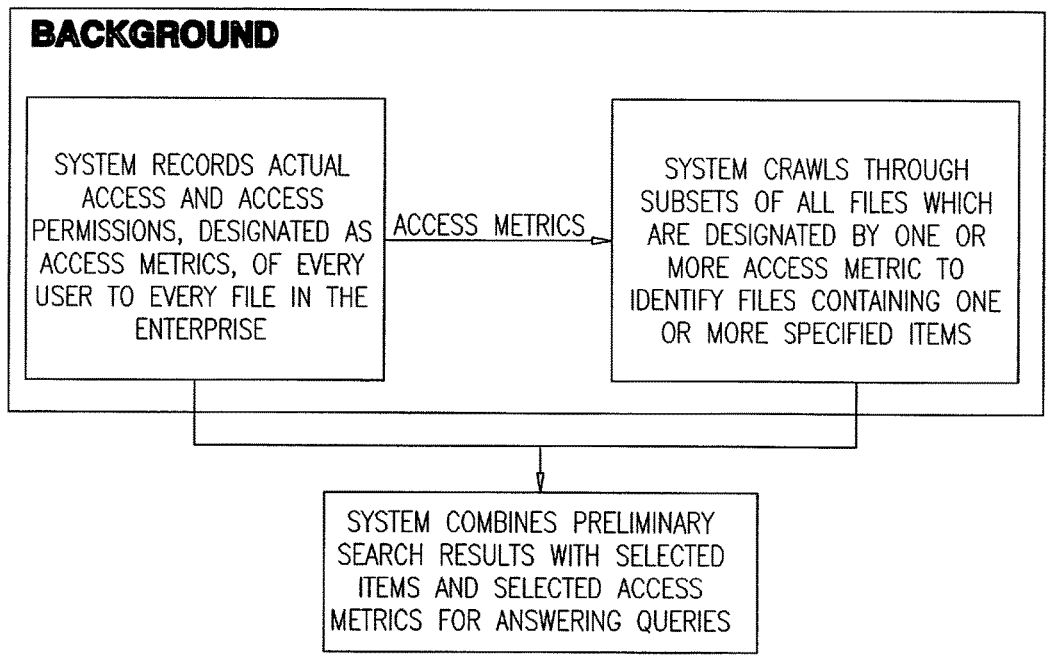
FIG. 3 is a simplified block diagram illustration of the system and methodology of the present invention.

Reference is now made to FIG. 3, which is a simplified block diagram illustration of the system and methodology of the present invention. As seen in FIG. 3 and described hereinabove in FIGS. 1 and 2 with reference to two specific examples, the system and methodology of the present invention includes the following functionality which takes place in the background:

Actual access of every user to every file in the enterprise is recorded and stored in a database. Access permissions of every user to every file in the enterprise are recorded and stored in a database. This functionality is embodied in a system, commercially available under the trademark DatAdvantage by an affiliate of the assignee of the present invention, Varonis Systems Inc. of New York, N.Y. and is described in U.S. Pat. No. 7,606,801 and in U.S. Published Patent Application 2009/0265780 of the present assignee, the disclosures of which are hereby incorporated by reference. Access permissions and/or actual access are together designated as access metrics and may be used to designate subsets of all of the files in the enterprise.

Crawling through files which are designated by one or more access metrics to identify files containing one or more specified items.

Upon receipt of a query, which could include a request for a report, the system combines information relating to actual access and/or access permissions with preliminary search result information, such as that provided by the crawling functionality described hereinabove, to provide a response which indicates which files which meet criteria established by access metrics specified in the query include items specified in the query.

Figure 4:
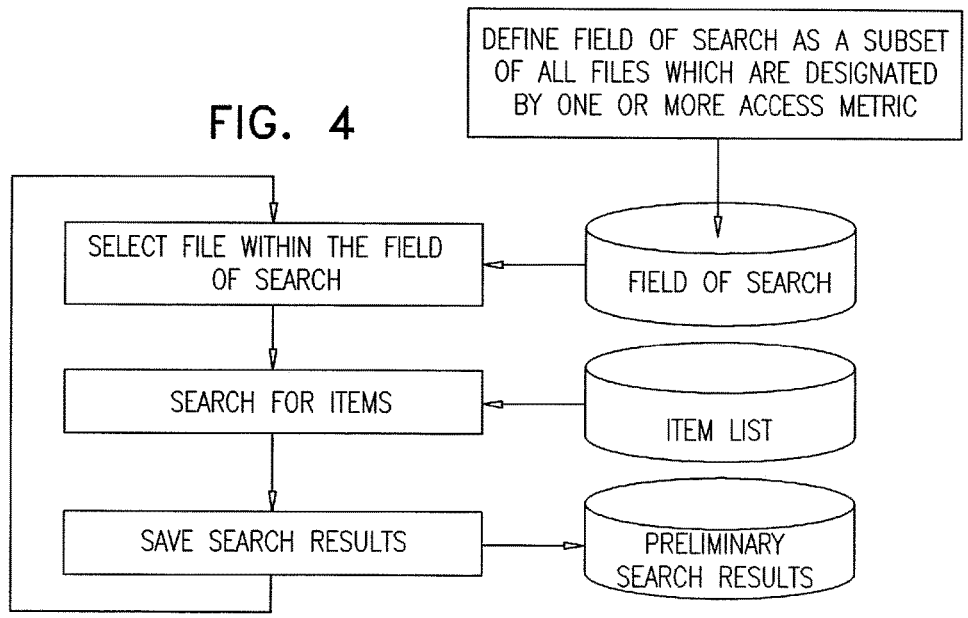
FIG. 4 is a simplified block diagram illustration of functionality for background characterization of data at least by at least one content characteristic thereof and at least one access metric thereof, useful in the system and methodology of FIG. 3.

Reference is now made to FIG. 4, which is a simplified block diagram illustration of crawling functionality for background characterization of data at least by at least one content characteristic thereof and at least one access metric thereof, useful in the system and methodology of FIG. 3.

The crawling functionality of FIG. 4 includes an initial step of defining a field of search for crawling in accordance with one or more access metric. The access metric is defined by one or both of access permissions and actual access and may change over time. For example the field of search may be: all files to which personnel of the legal department have access permission and have been accessed at least once within the last one year.

The system examines each file in the defined field of search for the presence of at least one item from among a collection of items stored in an item list database. Identification of files containing at least one item in the collection is stored in a preliminary search results database.

Figure 5:
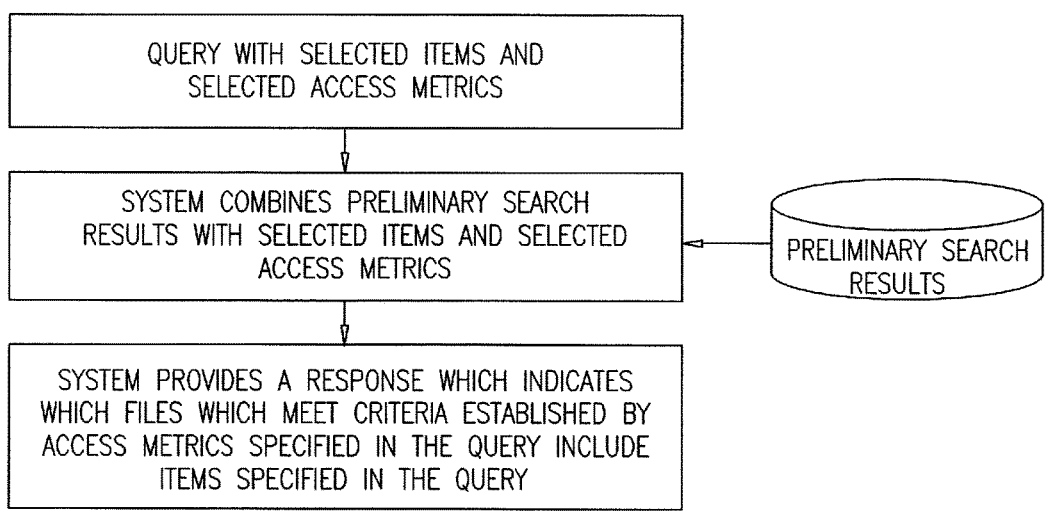
FIG. 5 is a simplified block diagram illustration of functionality for selecting data of interest from among a multiplicity of data elements by considering only data elements which are characterized by a given content characteristic and a given access metric thereof.

Reference is now made to FIG. 5, which is a simplified block diagram illustration of functionality for selecting data of interest from among a multiplicity of data elements by considering only data elements which are characterized by a given content characteristic and a given access metric thereof. The functionality of FIG. 5 takes place in response to a query which selects one or more items from among the specified items and one or more selected access metrics from among the access metrics used to define the field of search.

All of the files whose identification appear in the preliminary search results database are examined:
1. to ascertain which files include the selected items set forth in the query; and
2. to ascertain which files meet criteria established by the selected access metrics set forth in the query.

The foregoing two examinations may be conducted in any suitable order.

Files that both include the selected items set forth in the query and meet criteria established by the selected access metrics set forth in the query are reported in a response to the query.

Figure 6:
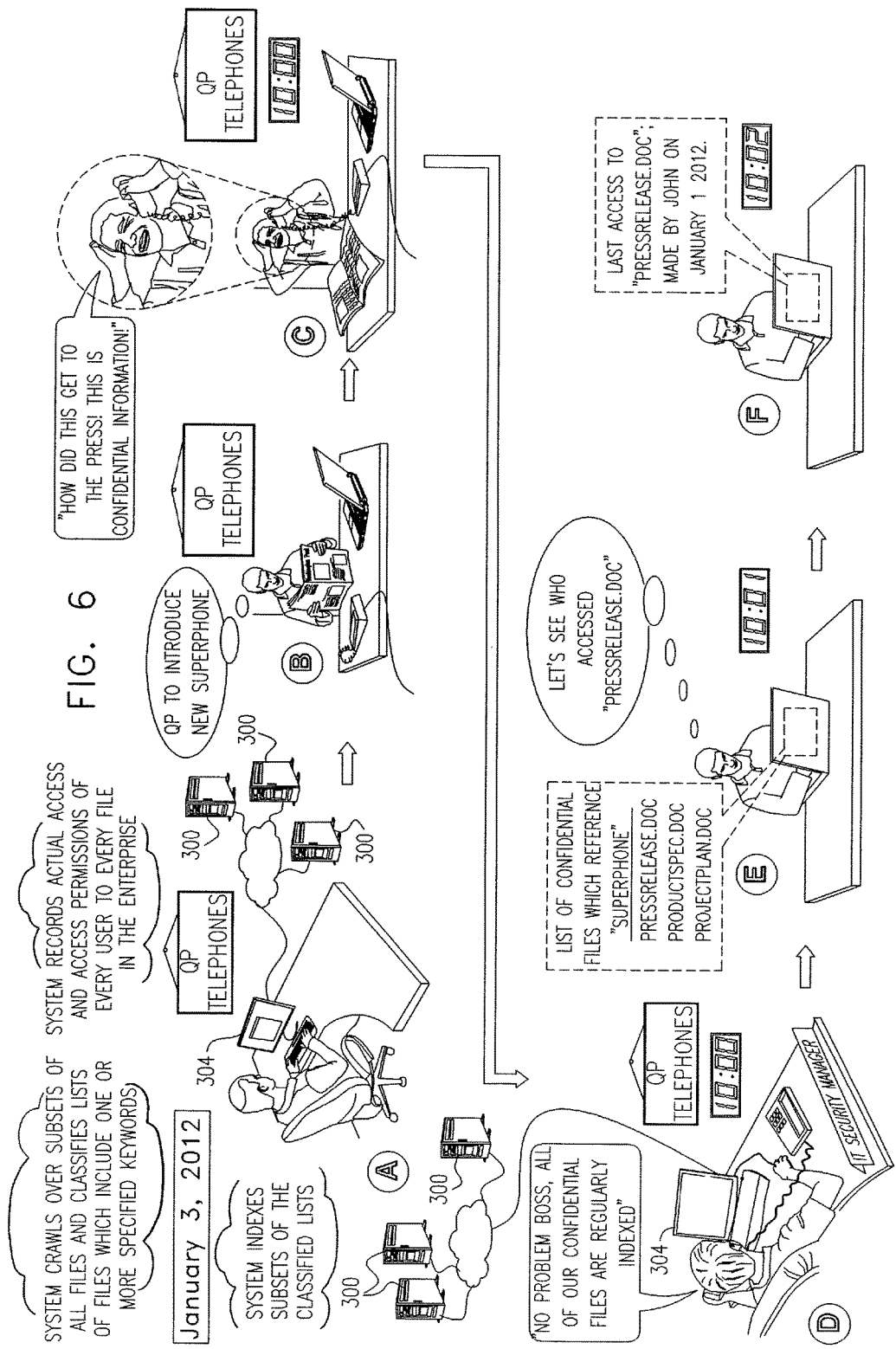
FIG. 6 is a simplified pictorial illustration an example of the operation of an additional embodiment of the present invention.

Reference is now made to FIG. 6, which is a simplified pictorial illustration an example of the operation of an additional embodiment of the present invention. In the example of FIG. 6, there is provided a system for indexing data of interest within a multiplicity of data elements residing on multiple platforms in an enterprise, the system preferably including:

background data characterization functionality operable for characterizing the multiplicity of data elements at least by at least one access metric thereof, the at least one access metric being selected from data access permissions and actual data access history to provide a background data characterization output;

background data classification functionality operative to classify the data of interest based at least partially on the background data characterization output and providing a background data of interest classification output; and indexing functionality operative to index the data of interest based at least partially on the background data of interest classification output.

As shown in FIG. 6, the system preferably resides on one of a multiplicity of servers 300 which are connected to an enterprise level network 302. Network 302 also preferably comprises a plurality of computers 304 connected thereto. Servers 300 may be located at disparate locations and are preferably operable for storing data elements, which are typically numbered in the thousands, hundreds of thousands or even millions.

As illustrated pictorially in stage A of FIG. 6, the system preferably operates in the background to record actual access and access permissions of every user to every data element in enterprise network 302. It is appreciated that the scope of activities of the system may be restricted to exclude certain users and certain data elements.

The system also preferably operates in the background to continuously crawl through subsets of all data elements in the enterprise and to classify lists of data elements which include one or more specified items such as a text or non-text item, a string and one or more specified keywords. Preferably, the subsets of files are selected in accordance with access permission metrics. For example, a subset of files to which legal personal have access permissions may be selected for classification as potentially being legal related.

The specified text items may be selected by an authorized manager as being appropriate for each subset. Thus, for example, for legal department files, keywords such as "confidential", "lawsuit" and "judgment" may be appropriate for classifying the data elements as being legal related. In other contexts, keywords such as "confidential" and "secret" may be appropriate for classifying data elements as being confidential. The set of text items may be updated from time to time by an authorized manager.

It is a particular feature of this embodiment of the present invention that the system also preferably operates in the background to regularly index at least subsets of the classified lists of data elements. It is appreciated that indexing of the classified data elements is operative to allow rapid searching of the classified data elements for any particular string.

Returning to the example of FIG. 6, it is seen that at stage B, the CEO of a company notices a headline in a newspaper announcing the launch of the company's new confidential product. The CEO then contacts the IT manager of enterprise network 302 and demands to know how information regarding the confidential product reached the press. As shown at stage C, the IT Manager responds that all confidential data elements are regularly indexed and therefore the file containing the information which reached the press can be rapidly located, and users who have recently accessed the file can be rapidly identified.

The IT Manager preferably proceeds to utilize the system to rapidly search all indexed files which were classified as confidential for references to the new confidential product. As shown at stage D, the IT Manager receives, in near real time, a list of relevant files. As thereafter shown at stage E, the IT Manager locates the specific information that was released to the press in one of the relevant files. As thereafter shown at stage F, the IT manager can then utilize the actual access and access permissions information which is continuously collected by the system to determine which users have recently accesses the relevant confidential file, and to thereby ascertain which employee was responsible for providing the confidential information to the press.

It is a particular feature of the present invention that due to the background operation of the system whereby the history of actual access of every user to every file in the enterprise is recorded, classified lists of files which include specified items are maintained and the classified lists are regularly indexed, the system enables the IT Manager to receive the results of his search for relevant files in near real time. The system achieves this near real time response by combining available actual access and access permissions information of classified lists of data elements with indexing information relating to the data elements.

Figure 7:
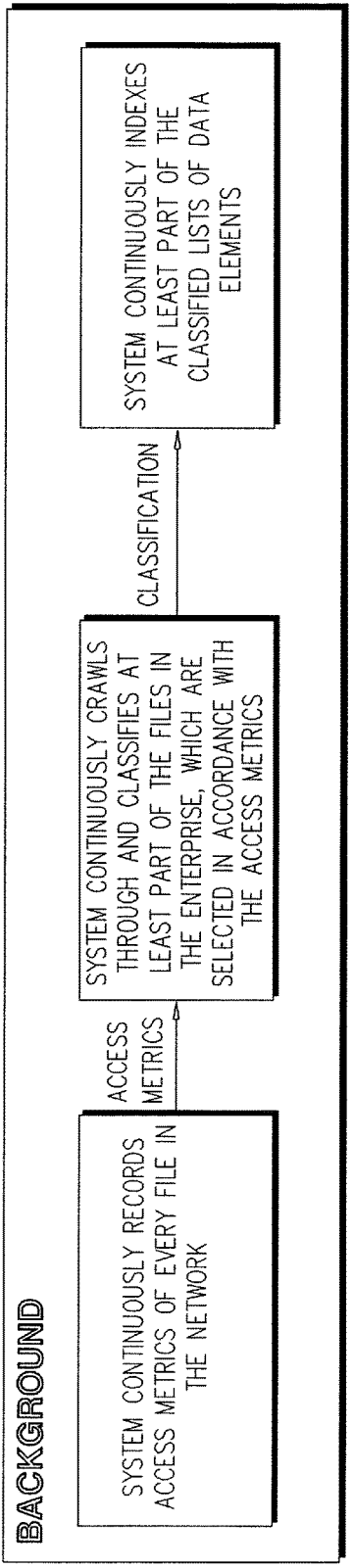
FIG. 7 is a simplified block diagram illustration of the system and methodology of the embodiment of FIG. 6.

Reference is now made to FIG. 7, which is a simplified block diagram illustration of the system and methodology of the embodiment of FIG. 6. As seen in FIG. 7 and described hereinabove in FIG. 6, the system and methodology of the present invention includes the following functionality which takes place in the background:

Actual access and access permissions of every user to every file in the enterprise is preferably continuously monitored and stored in a database. This functionality is embodied in a system, commercially available under the trademark DatAdvantage by an affiliate of the assignee of the present invention, Varonis Systems Inc. of New York, N.Y. and is described in U.S. Pat. No. 7,606,801 and in U.S. Published Patent Application 2009/0265780 of the assignee, the disclosures of which are hereby incorporated by reference. Access permissions and/or actual access are together designated as access metrics and may be used to designate subsets of all of the files in the enterprise.

Additionally, the system preferably continuously crawls through subsets of all files in the enterprise which are selected in accordance with the access metrics and classifies lists of files which include one or more specified items such as a text or non-text item, a string and one or more specified keywords.

Additionally, the system preferably continuously operates in the background to regularly index at least subsets of the classified lists of data elements.

Figure 8:
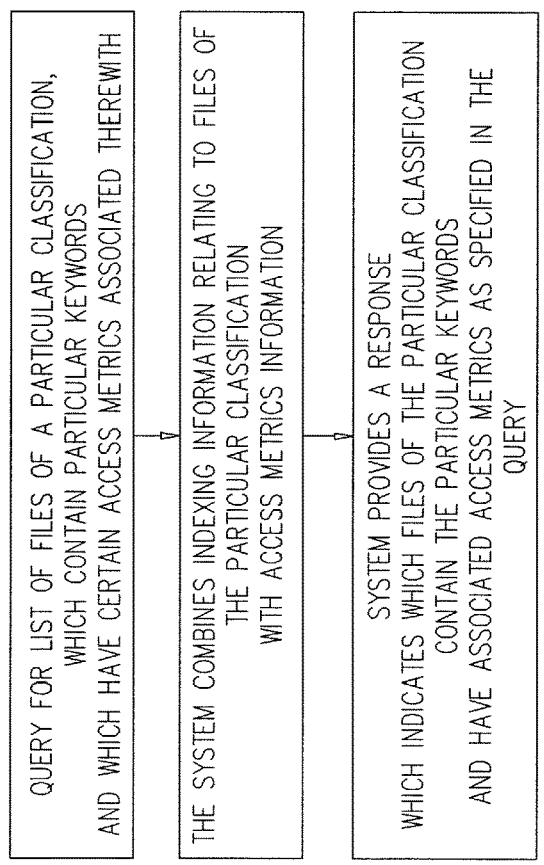
FIG. 8 is a simplified block diagram illustration of the use of the system and methodology of FIGS. 6 & 7 for selecting data of interest from among a multiplicity of data elements by considering only data elements which are characterized by a given content classification, a given characteristic and a given access metric thereof.

Reference is now made to FIG. 8, which is a simplified block diagram illustration of the use of the system and methodology of FIGS. 6 & 7 for selecting data of interest from among a multiplicity of data elements by considering only data elements which are characterized by a given content classification, a given characteristic and a given access metric thereof.

As shown in FIG. 8, upon receipt of a query, which could, for example, include a request for a list of files of a particular classification which contain particular keywords and which have certain access metrics associated therewith, the system preferably combines indexing information relating to files of the particular classification with access metrics information such as that provided by the crawling functionality described hereinabove, to provide a response which indicates which files of the particular classification contain the particular keywords and have associated access metrics as specified in the query.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for indexing data of interest within a multiplicity of data elements residing on multiple platforms in an enterprise, each of said data elements comprising at least data content and at least one access metric associated therewith, the system comprising a processor and memory and:
   background actual access and access permissions recording functionality employing said processor and memory to continuously record actual access and access permissions of every user to each of said multiplicity of data elements residing on multiple platforms in said enterprise;
   background data content classification functionality employing said processor and memory, independently of indexing, to continuously classify data of interest by considering only data elements having data content comprising at least one of a text item, a non-text item, a string and at least one keyword and to provide a background data of interest classification output;
   near real time data matching functionality employing said processor and memory for selecting data of interest by considering only data elements which have said at least one access metric from among said background data of interest classification output, said at least one access metric being selected from data access permissions and actual data access history recorded by said background actual access and access permissions recording functionality, to provide a background data characterization output in near real time;
   indexing functionality employing said processor and memory to index only data content of said data elements included in said background data characterization output, said indexing functionality facilitating searching of data content of said data elements included in said background data characterization output for any of a multiplicity of strings comprised therein, said near real time data matching functionality comprising:

searching functionality operable to employ an output of said indexing functionality for searching for data elements which have at least one content characteristic thereof;

identification functionality operable for identifying data elements from among said multiplicity of data elements in accordance with said at least one access metric; and combining functionality operable for combining results of said searching and said identifying; and background data characterization functionality operable for characterizing said multiplicity of data elements at least by said at least one access metric thereof, said at least one access metric being selected from data access permissions and actual data access history, to provide a background data characterization output;

said background data content classification functionality being operable, independently of indexing, to classify data of interest based at least partially on said background data characterization output.

2. A system for indexing data of interest within a multiplicity of data elements residing on multiple platforms in an enterprise according to claim 1 and wherein said indexing functionality is operative to index said data of interest also based on said background data characterization output.

3. A system for indexing data of interest within a multiplicity of data elements according to claim 1 and wherein said at least one access metric is a dynamic metric which changes over time during operation of the enterprise.

4. A system for indexing data of interest within a multiplicity of data elements residing on multiple platforms in an enterprise according to claim 1 and wherein said searching functionality and said identification functionality are provided by separate entities.

5. A method for indexing data of interest within a multiplicity of data elements residing on multiple platforms in an enterprise, each of said data elements comprising at least data content and at least one access metric associated therewith, the method comprising:

continuously recording actual access and access permissions of every user to each of said multiplicity of data elements residing on multiple platforms in said enterprise;

continuously classifying, independently of indexing, data of interest by considering only data elements having data content comprising at least one of a text item, a non-text item, a string and at least one keyword and providing a background data of interest classification output;

selecting, in near real time, data of interest by considering only data elements which have said at least one access metric from among said background data of interest classification output, said at least one access metric being selected from said recorded data access permissions and actual data access history, to provide a background data characterization output in near real time;

indexing only data content of said data elements included in said background characterization output, said indexing comprising facilitating searching of data content of said data elements included in said background data characterization output for any of a multiplicity of strings comprised therein, said selecting comprising:

employing an output of said indexing for searching for data elements which have at least one content characteristic thereof;

identifying data elements from among said multiplicity of data elements in accordance with said at least one access metric; and combining results of said searching and said identifying, characterizing said multiplicity of data elements at least by said at least one access metric thereof, said at least one access metric being selected from data access permissions and actual data access history to provide a background data characterization output; and classifying, independently of indexing, data of interest based at least partially on said background data characterization output.

6. A method for indexing data of interest within a multiplicity of data elements residing on multiple platforms in an enterprise according to claim 5 and wherein said indexing also comprises indexing said data of interest based on said background data characterization output.

7. A method for indexing data of interest within a multiplicity of data elements according to claim 5 and wherein said at least one access metric is a dynamic metric which changes over time during operation of the enterprise.

8. A method for indexing data of interest within a multiplicity of data elements residing on multiple platforms in an enterprise according to claim 5 and wherein said searching and said identifying are performed by separate entities.

* * * * *